United States Patent

[11] 3,599,548

| [72] | Inventor | Fridolin Hennig<br>Munchen, Germany |
|---|---|---|
| [21] | Appl. No. | 27,531 |
| [22] | Filed | Apr. 13, 1970 |
| [45] | Patented | Aug. 17, 1971 |
| [73] | Assignee | Agfa-Gevaert Aktiengesellschaft<br>Leverkusen, Germany |
| [32] | Priority | Apr. 15, 1969 |
| [33] | | Germany |
| [31] | | P 19 19 014.8 |

[54] RELEASE MEANS FOR PHOTOGRAPHIC APPARATUS
10 Claims, 2 Drawing Figs.

[52] U.S. Cl. ........................................... 95/11 R, 200/61.85
[51] Int. Cl. ....................................... G03b 17/00
[50] Field of Search ............................. 95/10 C, 11 R; 200/61.58, 61.85, 168, 52

[56] References Cited
UNITED STATES PATENTS

| 3,186,319 | 6/1965 | Hochstein | 95/10 (C) |
| 3,220,326 | 11/1965 | Scudder | 95/10 (C) |
| 3,307,460 | 3/1967 | Land | 95/10 (C) |

Primary Examiner—Joseph F. Peters, Jr.
Attorney—Michael S. Striker

ABSTRACT: A release for motion picture cameras or still cameras wherein the deformation of a diaphragm results in closing of a switch which can open the shutter. A knob is mounted close to the diaphragm and is displaceable by the finger which exerts a deforming stress on the diaphragm to thereby close a second switch which can complete the circuit of the exposure control and/or a battery tester. The knob surrounds at least a portion of the diaphragm to facilitate simultaneous application of finger pressure against the knob and against the central part of the diaphragm.

PATENTED AUG 17 1971

3,599,548

INVENTOR.
FRIDOLIN HENNIG

BY *[signature]*
Attorney 3,599,548

RELEASE MEANS FOR PHOTOGRAPHIC APPARATUS

CROSS-REFERENCE TO RELATED APPLICATION

The release means of the present invention constitutes an improvement over and a further development of the camera release which is disclosed in the copending application Ser. No. 20,274, filed Mar. 17, 1970 by Kremp et al. and assigned to the same assignee.

BACKGROUND OF THE INVENTION

The present invention relates to photographic apparatus in general, and more particularly to improvements in release means for still cameras or motion picture cameras. Still more particularly, the invention relates to improvements in release means of the type utilizing a deformable diaphragm which can close a microswitch or the like to thereby effect functioning of a shutter and/or another functional assembly of the camera.

SUMMARY OF THE INVENTION

An object of the invention is to provide novel and improved release means which can initiate two or more functions in a desired sequence.

Another object of the invention is to provide release means which occupies little room and wherein the application of pressure by a single finger suffices to initiate two or more operations in a desired sequence.

A further object of the invention is to provide release means which can be installed in many presently known types of still cameras or motion picture cameras.

An additional object of the invention is to provide release means which enables the user of the camera to perform at least one operation without making an exposure, for example, to test the condition of the energy source and/or to determine the intensity of scene light prior to opening of the shutter so that the user of the camera knows whether or not the energy source is satisfactory or whether or not the lighting conditions are satisfactory and proceeds to make an exposure only if assured that such exposure will be acceptable.

The invention is embodied in a still camera or motion picture camera which comprises a housing including a wall member, a diaphragm member mounted in the wall member so that its outer side is readily accessible to a finger of the user, the diaphragm member being deformable in response to the application of finger pressure in a predetermined direction, preferably at right angles to the plane of the diaphragm member when the latter assumes its undeformed condition, an actuating element mounted in the housing in the general region of the diaphragm member and being displaceable from a first to a second position in response to the application of finger pressure whereby the actuating element preferably moves in the aforementioned predetermined direction, and a plurality of functional assemblies mounted in the housing and including a first assembly (e.g., a shutter mechanism) arranged to function (for example, to be cocked, to open or to open and to thereupon close after a fixed or variable interval of time) in response to deformation of the diaphragm member, and a second assembly (for example, an exposure control circuit or testing device for battery current or the intensity of scene light) arranged to function in response to displacement of the actuating element to second position.

In its first position, the actuating element preferably extends outwardly beyond the outer side of the diaphragm member and/or wall member and is preferably mounted sufficiently close to the diaphragm member to be displaced in response to the pressure applied by that finger which is used to effect deformation of the diaphragm member.

Each of the functional assemblies may include at least one electric switch which is respectively closed in response to deformation of the diaphragm member and in response to displacement of the actuating element to its second position.

The novel features which are considered as characteristic of the invention are set forth in particular in the appended claims. The improved camera release means itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
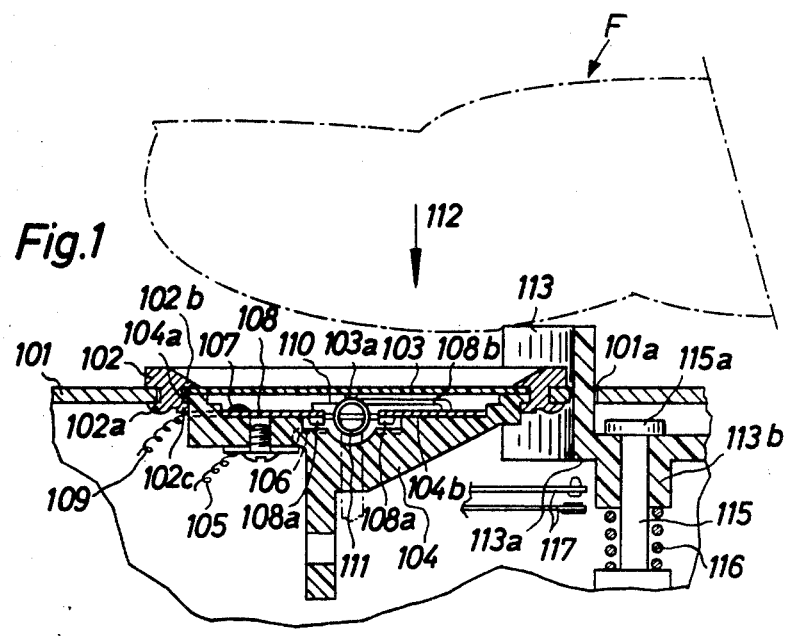
FIG. 1 is an enlarged sectional view of a photographic camera including a release means which embodies the present invention.

The drawing illustrates a portion of a photographic camera whose housing includes a wall 101 which may constitute the top wall of the housing in a still camera, the top wall or front wall of the body of a motion picture camera, or a portion of the pistol grip handle in a motion picture camera. The wall 101 is provided with a circular opening for a ring-shaped frame 102 constituting a holding means for a deformable diaphragm 103 which is substantially flush with the wall 101. The frame 102 includes coupling lugs 102a which are bent over against the inner side of the wall 101 to thus mount the parts 102, 103 in the housing. The diaphragm 103 preferably consists of synthetic plastic material and its circular marginal portion abuts against the inner side of an internal flange 102b forming part of the frame 102. The central portion of the diaphragm 103 is provided with a preferably integral inward extension or protuberance 103a.

The frame 102 is provided with arcuate extensions 102c which cooperate with similar arcuate extensions 104a of a carrier 104 to constitute a bayonet lock which establishes a readily separable connection between the parts 102 and 104. The carrier 104 consists of insulating material and supports a platelike contact 106 of a microswitch. The contact 106 is connected with a conductor 105. The carrier 104 is further provided with a recess 104b which accommodates a second platelike contact 108 of the microswitch. The contact 108 is secured to the carrier 104 by one or more screws 107 or analogous fasteners and is connected with a second conductor 109. The contacts 106, 108 cannot come into direct current conducting engagement with each other but the microswitch comprises a movable third contact 110 which is in permanent current-conducting engagement with the contact 108 and can be pivoted into engagement with the contact 106; such pivoting takes place in response to deformation of the diaphragm 103 in the direction indicated by the arrow 112.

The contact 108 is provided with an upwardly extending projection 108b flanked by two downwardly extending projections 108a; these projections provide a knife edge bearing for one marginal portion of the contact 110. The opposite marginal portion of the third contact 110 is connected to one end of a helical spring 111 which tends to maintain it in an inoperative position (out of engagement with the lower contact 106). The other end of the spring 111 is attached to the carrier 104. The projection 108b constitutes a stop which determines the inoperative position of the third contact 110.

The parts 102, 104 are separably connected to each other by the aforementioned extensions 102c, 104a to a structural unit which is inserted into the opening of and attached to the wall 101 by the lugs 102a. The conductors 105, 109 are respectively connected to the contacts 106, 108 subsequent to mounting of the frame 102 in the wall 101. For example, the conductors 105, 109 may be connected in the circuit of a first functional assembly which includes an electromagnet (not shown) serving to open and/or close the shutter blade or blades. When the diaphragm 103 is deformed in response to pressure which is applied by a finger F in the direction indicated by the arrow 112, its protuberance 103a bears against the central portion of the spring 111 and causes the latter to abruptly pivot the third contact 110 against the contact 106 and to thus close the microswitch so as to effect functioning of the aforementioned assembly. A relatively minor deformation of the diaphragm 103 suffices to effect pivotal movement of the contact 110 into engagement with the contact 106. The diaphragm 103 is sufficiently elastic to automatically reassume its undeformed condition when the finger pressure against its outer side is terminated. This enables the spring 111 to return the contact 110 to the inoperative position, i.e., to open the microswitch 106, 108, 110.

The heretofore-described components of the improved camera release means are described and claimed in the aforementioned copending application Ser. No. 20,274 of Kremp et al.

As shown in FIG. 1, the frame 102 preferably extends outwardly beyond the outer sides of the diaphragm 103 and wall 101 and to thus enable the user of the camera to readily locate the frame and the diaphragm even if the user does not look at the diaphragm, i.e., the user can look through the view finder of the camera. Furthermore, the outwardly extending portion of the frame 102 reduces the likelihood of accidental deformation of the diaphragm 103.

Figure 2:
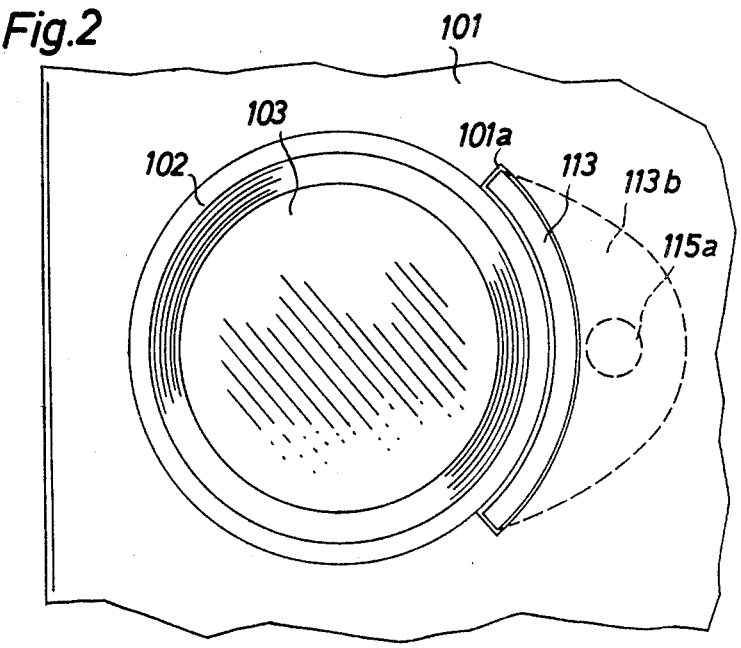
FIG. 2 is a plan view of the structure shown in FIG. 1.

In accordance with a feature of the invention, the camera release means further comprises an actuating element 113 for a second functional assembly of the camera which includes a second electric switch 117. The actuating element 113 is an arcuate or ring-shaped knob which is adjacent to the frame 102 and preferably surrounds at least a portion of the diaphragm 102. As shown in FIG. 2, the center of curvature of the knob 113 is located in the center of the diaphragm 103. The wall 101 is provided with an arcuate slot 101a through which the outer part of the knob 113 extends so that it normally projects at least slightly beyond the outer sides of the diaphragm 103 and wall 101. The knob 113 is provided with a platelike extension 113b which is accommodated in the interior of the camera housing and is confined to reciprocatory movement by a fixedly mounted guide here shown as a bolt 115. The head 115a of the bolt 115 determines the outer end position of the knob 113; the latter is biased to such end position by a relatively weak helical spring 116 which surrounds the stem of the bolt 115. The knob 113 has an inner end face 113a which closes the switch 117 when the operator applies finger pressure against the outwardly extending part of the knob. As shown in FIG. 2, the knob 113 is sufficiently close to the diaphragm 103 to enable a user to apply simultaneous finger pressure against the diaphragm (arrow 112) and against the outwardly extending part of the knob. The bias of the spring 116 is preferably less than the force of the spring 111. The switch 117 may from part of a functional assembly which serves to test the battery or batteries in the camera and/or of an assembly which constitutes the exposure control to automatically select the exposure time and/or the aperture size prior to opening of the shutter.

The operation of the improved camera release means is as follows:

When the user wishes to make an exposure, finger pressure is applied in the direction indicated by the arrow 112 whereby the finger F moves the knob 113 from the position shown in FIG. 1 to a second position in which the end face 113a closes the switch 117 to thus complete the circuit of the exposure control and/or a battery tester. The finger F thereupon effects sufficient deformation of the diaphragm 103 so that the protuberance 103a causes the spring 111 to snap over and to close the microswitch by moving the contact 110 against the contact 106. This can result in opening of the shutter.

The improved camera release means is susceptible of many modifications without departing from the spirit of the present invention. For example, the knob 113 may form a ring which completely or nearly completely surrounds the frame 102 and the diaphragm 103; also, the outermost part of the knob 113 may constitute a round or polygonal pushbutton. Still further, the assembly which is caused to function in response to displacement of the knob 113 (or an analogous actuating element) in the direction indicated by arrow 112 can be mechanically connected with the actuating element, for example, by a linkage which receives motion from the extension 113b. The knob 113 can open or close two electric switches, for example, a first switch in a battery testing circuit and a second switch in the circuit of the exposure control. Still further, the bolt 115 may be adjustably mounted in the camera housing to place its head 115a to a selected one of several positions in each of which the knob 113 projects to a different extent beyond the outer side of the wall 101. Analogously, the camera may include an adjustable stop which determines the extend of movement of the knob 113 from the illustrated position to the second position in which the switch 117 is closed. The assembly which is caused to function in response to depression of the knob 113 need not include any electrical parts. Finally, the guide means for the knob 113 or for an analogous actuating element may comprise two or more bolts.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What I claim as new and desire to protect by Letters Patent is set forth in the appended claims:

1. In a photographic camera, a combination comprising a housing including a wall member; a diaphragm member mounted in said wall member and being deformable in response to the application of finger pressure; and actuating element mounted in said housing in the general region of said diaphragm member and being displaceable from a first to a second position in response to the application of finger pressure; and a plurality of functional assemblies provided in said housing and including a first assembly arranged to function in response to deformation of said diaphragm member and a second assembly arranged to function in response to displacement of said actuating element.

2. A combination as defined in claim 1, wherein said actuating element extends outwardly beyond at least one of said members in the first position thereof and is sufficiently close to said diaphragm member to be displaced in response to pressure applied by that finger which is used to effect deformation of said diaphragm member.

3. A combination as defined in claim 2, wherein said diaphragm member is deformable in response to the application of finger pressure in a predetermined direction and wherein said actuating element is arranged to move in said predetermined direction during displacement from the first to the second position thereof.

4. A combination as defined in claim 1, wherein said first assembly includes at least one electric switch which is closed in response to deformation of said diaphragm member.

5. A combination as defined in claim 1, wherein said second assembly includes at least one electric switch which is closed in response to displacement of said actuating element.

6. A combination as defined in claim 1, wherein said diaphragm member has a substantially circular outline and wherein said actuating element extends along an arc having its center of curvature in the center of said diaphragm member, said actuating element surrounding at least a portion of said diaphragm member.

7. A combination as defined in claim 1, further comprising means for biasing said actuating element to said first position thereof with a force which is less than the force necessary to deform said diaphragm member.

8. A combination as defined in claim 1, wherein said actuating element is reciprocable between said first and second positions and further comprising guide means for confining said actuating element to such reciprocatory movement.

9. A combination as defined in claim 1, wherein said diaphragm member consists of elastomeric material and tends to assume an undeformed condition.

10. A combination as defined in claim 1, wherein said diaphragm member is substantially flush with said wall member and wherein said actuating element at least partially surrounds said diaphragm member so that it is normally in the way of and is displaced by the finger which applies pressure to the diaphragm member.